US008452046B2

(12) United States Patent
Venkoparao et al.

(10) Patent No.: US 8,452,046 B2
(45) Date of Patent: May 28, 2013

(54) METHOD AND APPARATUS FOR AUTOMATIC SEDIMENT OR SLUDGE DETECTION, MONITORING, AND INSPECTION IN OIL STORAGE AND OTHER FACILITIES

(75) Inventors: Vijendran Gopalan Venkoparao, Bangalore (IN); Bin Sai, Den Haag (NL)

(73) Assignee: Honeywell International Inc., Morristown, NJ (US)

( * ) Notice: Subject to any disclaimer, the term of this patent is extended or adjusted under 35 U.S.C. 154(b) by 569 days.

(21) Appl. No.: 12/558,368

(22) Filed: Sep. 11, 2009

(65) Prior Publication Data
US 2010/0086172 A1 Apr. 8, 2010

Related U.S. Application Data

(60) Provisional application No. 61/103,461, filed on Oct. 7, 2008.

(51) Int. Cl.
*G06K 9/00* (2006.01)
*G06K 9/34* (2006.01)

(52) U.S. Cl.
USPC .......................................... 382/100; 382/173

(58) Field of Classification Search
USPC ..................... 382/100, 173; 73/49.2; 426/523
See application file for complete search history.

(56) References Cited

U.S. PATENT DOCUMENTS

| 5,694,481 | A | * | 12/1997 | Lam et al. | 382/145 |
| 2003/0131662 | A1 | * | 7/2003 | Lease | 73/313 |
| 2006/0177555 | A1 | * | 8/2006 | Doi et al. | 426/523 |
| 2009/0202149 | A1 | * | 8/2009 | Doi et al. | 382/173 |

FOREIGN PATENT DOCUMENTS

JP 06-273255 * 9/1994

OTHER PUBLICATIONS

Sakagami et al, (Measurement of Accumulated Height of Petroleum Sludge [Online], vol. 15, 2005, pp. 480-481).*
John et al (Locating levels in Tanks and soils using infrared thermography, SPIE vol. 5405, pp. 245-248).*
Sakagami et al "Measurement of acumulated height of petrolum sludge [online], vol. 15, 2005, pp. 480-481".*
John Snell et al., Locating Levels in Tanks and Silos Using Infrared Thermography, SPIE, vol. 5405, No. 1, Apr. 13, 2004, pp. 245-248, Orlando, FL, USA, XP002565063.
Charles J. Hellier, Handbook of Nondestructive Evaluation, McGraw-Hill, ISBN: 978 007 028 121 9, 2001, p. 9.38-9.39, XP002565065.
FLIR Systems, AOST FLIR Therography Seminar Presentation—Part 2—Applications, [Online], Jun. 14, 2005, pp. 8-34, XP002565066.
Sakagami Takahide et al., Measurement of Accumulated Height of Petroleum Sludge . . . ,[Online], vol. 15, 2005, pp. 480-481, XP002565064.

* cited by examiner

*Primary Examiner* — Amara Abdi

(57) ABSTRACT

A method includes receiving an image of a storage tank at a processing system, where the storage tank is capable of storing one or more materials. The method also includes processing the image to identify a level, profile, or amount of sludge or sediment present in the storage tank. Processing the image could include segmenting the image into multiple segments and using the segments to identify a non-linearity in the image. The image could be segmented into segments having different grey levels using grey level values associated with previously-identified sediment or sludge. The identified level or amount of sludge or sediment could be used to automatically schedule maintenance for the storage tank.

20 Claims, 4 Drawing Sheets

METHOD AND APPARATUS FOR AUTOMATIC SEDIMENT OR SLUDGE DETECTION, MONITORING, AND INSPECTION IN OIL STORAGE AND OTHER FACILITIES

CROSS-REFERENCE TO RELATED APPLICATIONS

This application claims priority under 35 U.S.C. §119(e) to U.S. Provisional Application No. 61/103,461 filed on Oct. 7, 2008, which is hereby incorporated by reference.

TECHNICAL FIELD

This disclosure relates generally to inventory management systems. More specifically, this disclosure relates to a method and apparatus for automatic sediment or sludge detection, monitoring, and inspection in oil storage and other facilities.

BACKGROUND

Processing facilities and other facilities routinely include tanks for storing liquid materials and other materials. For example, storage tanks are routinely used in tank farm facilities and other storage facilities to store oil or other materials. As another example, oil tankers and other transport vessels routinely include numerous tanks storing oil or other materials.

Online automatic monitoring of storage tank facilities is an important application for tank farms and other facilities. For example, sediment or sludge can collect at the bottom of a storage tank. This sediment or sludge typically cannot be automatically pumped out of a storage tank. The sediment or sludge can continue to grow above the bottom of the tank over time. If the height of the sediment or sludge becomes too high, mega-watt mixers often have to be used in order to remove the sediment or sludge, which consumes lots of energy.

Current methods for inspecting the sediment or sludge in a storage tank are time consuming, hazardous, and very expensive. For example, in some approaches, operators actually go to tank roofs and perform hand dipping of instruments at a limited number of points. However, large storage tanks often have diameters of tens of meters, and the limited discrete points of inspection are typically not adequate to cover the complete area of the tank bottom. Other inspection methods require shutdown of a tank's operation and emptying of any stored material from the tank. That inspection can therefore result in lost revenue because no tank operations are occurring. Also, even though robots are often used in chemical cleaning processes in some advanced facilities, most refineries and other facilities do not know when a cleaning process is needed. Rather, these facilities simply follow certain periodic manual inspection schedules. This is true in finished goods storage tanks and other tanks, as well.

SUMMARY

This disclosure provides a method and apparatus for automatic sediment or sludge detection, monitoring, and inspection in oil storage and other facilities.

In a first embodiment, a method includes receiving an image of a storage tank at a processing system, where the storage tank is capable of storing one or more materials. The method also includes processing the image to identify a level, profile, or amount of sludge or sediment present in the storage tank.

In a second embodiment, an apparatus includes an interface configured to receive an image of a storage tank, where the storage tank is capable of storing one or more materials. The apparatus also includes a processing device configured to process the image and to identify a level, profile, or amount of sludge or sediment present in the storage tank.

In a third embodiment, a computer readable medium embodies a computer program. The computer program includes computer readable program code for receiving an image of a storage tank, where the storage tank is capable of storing one or more materials. The computer program also includes computer readable program code for processing the image to identify a level, profile, or amount of sludge or sediment present in the storage tank.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
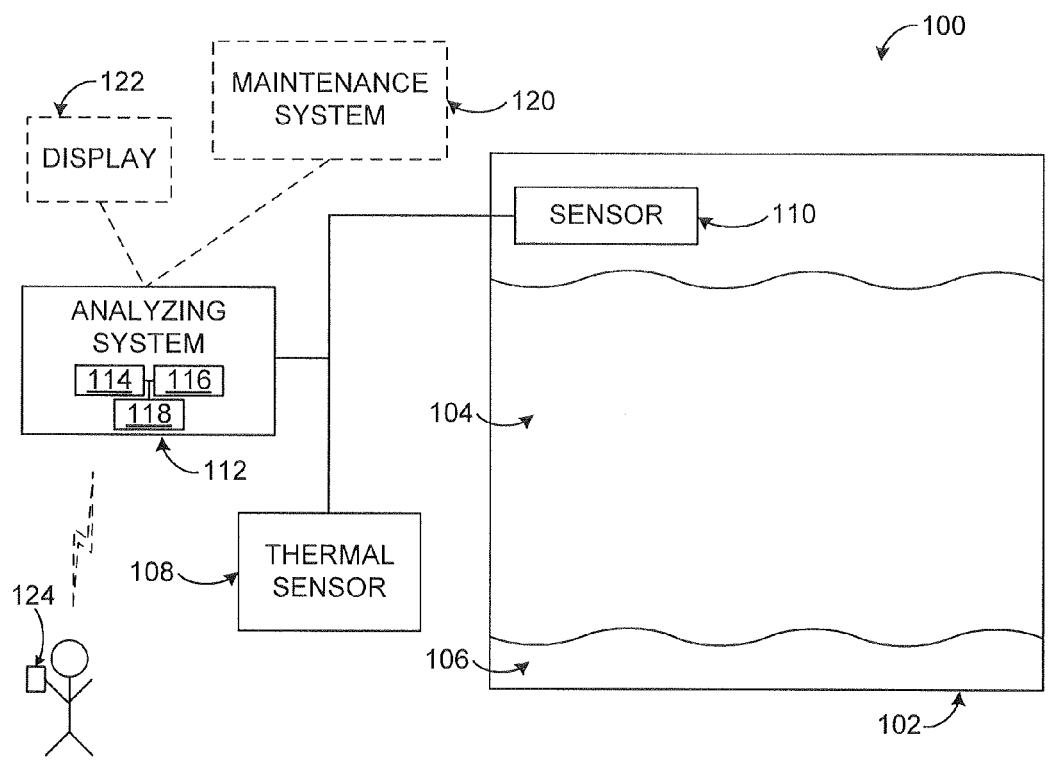
FIG. 1 illustrates an example automatic sediment or sludge detection, monitoring, and inspection system according to this disclosure.

FIG. 1 illustrates an example automatic sediment or sludge detection, monitoring, and inspection system 100 according to this disclosure. In this example embodiment, a tank 102 can store one or more materials 104. The tank 102 generally represents any suitable structure for receiving and storing at least one liquid or other material. The tank 102 could, for example, represent an oil storage tank or a tank for storing other liquid(s) or other material(s). The tank 102 could also have any suitable shape and size. Further, the tank 102 could form part of a larger structure. The larger structure could represent any fixed or movable structure containing or associated with one or more tanks 102, such as a movable tanker vessel, railcar, or truck or a fixed tank farm.

Sediment or sludge 106 can form at the bottom of the tank 102. Over time, the amount of sediment or sludge 106 can increase to the point where it interferes with storage of the material 104 in the tank 102. At that point (or at other times), a robotic assembly or other manual or automatic mechanisms can be used to clean the tank 102 and remove the sediment or sludge from the tank 102. In this document, the phrase "sediment or sludge" generally refers to material in a tank that cannot be or is difficult to pump out of the tank and that requires mega-watt mixers, robotic intervention, or other physical intervention to remove the material from the tank.

One or more thermal imaging sensors 108 capture images of the tank 102. These images could represent grey-scale or color images identifying various temperatures within the tank 102. Each sensor 108 includes any suitable structure for capturing thermal images, such as an infrared camera or other infrared sensor. One or more additional sensors 110 may also operate within the tank 102. These sensors 102 could include water probes, level sensors, or temperature sensors.

Data from the sensors 108-110 is provided to an analyzing system 112. The system 112 can analyze the data from the sensors. Based on this analysis, the system 112 can detect and monitor the level, profile, or amount of sediment or sludge 106 in the tank 102. The analyzing system 112 includes any processing device or system capable of analyzing thermal images or other data to determine a level, profile, or amount of sediment or sludge in at least one tank. In this example, the analyzing system 112 includes at least one processing device 114, such as a processor, microprocessor, controller, microcontroller, or digital signal processor. The analyzing system 112 in this example also includes at least one memory 116 storing instructions and data used, generated, or collected by the analyzing system 112 and at least one network interface 118 for communicating over at least one network. Note that the analyzing system 112 could analyze data for one or multiple tanks 102.

The system 112 can perform other actions based on the detected level, profile, or amount of sediment or sludge 106 in the tank 102. The system 112 could, for example, schedule cleaning operations for the tank 102 using a maintenance system 120, display the detected level, profile, or amount of sediment or sludge 106 on a display 122, or communicate the detected level, profile, or amount of sediment or sludge 106 to a user's wireless device 124 or other device. The system 112 could take any other or additional action(s).

In this way, the system 100 provides for automatic tank inspection using thermal or other sensing technology to detect and monitor tank sediment or sludge thickness, level, or volume. This may provide customers with a more accurate and efficient schedule of tank maintenance and cleaning.

As a particular example of an implementation of the system 100, in some embodiments a tank 102 is used to store crude oil or other hydrocarbons. Crude oil has the propensity to separate into heavier and lighter hydrocarbons. As the "heavier" straight-chain hydrocarbons (such as C20+ hydrocarbon molecules) flocculate, they tend to fall out of suspension within a static fluid. These hydrocarbons tend to accumulate on the tank floor as a viscous gel. Over time, this gel stratifies as volatile components within the gel are "flashed" from the gel with changes in temperature and pressure. This departure of the volatile components results in a concentration increase of the heavier fractions, resulting in increased density and viscosity and decreased mobility. The result is sediment or sludge 106 formed on the floor of the tank 102.

There is usually a perceivable temperature difference between the sediment or sludge 106 and lighter oil (material 104). Using high-resolution images of a tank 102 from infrared cameras or other thermal sensors 108, the level of the sediment or sludge 106 in the tank 102 can be identified. For example, the grey level difference between heavier and lighter hydrocarbons can be analyzed. The sediments or sludge 106 can be expected at a different temperature than the lighter oil, which can be discerned by thermal images. The system 112 can implement algorithms for estimating the volume of the sediments or sludge 106 and for estimating the sediment or sludge thickness. In particular embodiments, the thermal imaging can be integrated with other functions, such as temperature and level gauging instruments and water interface probes to profile the tank bottom filled with sediment, slurry, water, and oil residues. The thermal imaging can also be integrated with other technologies (such as corrosion and leak detection) to provide more comprehensive solutions for automated online tank inspections.

In some embodiments, a high-resolution thermal sensor 108 (together with level and multi-spot temperature) is used to capture the images of individual tanks 102. These images are analyzed by the system 112 using image processing algorithms to segment the images into different grey levels, resulting in a temperature profile for each tank 102 under observation. Along with other sensors (such as level gauges, tank-shell and multi-spot temperature sensors), the thickness profile of the sediment or sludge 106 formed on the bottom of the tank 102 can be measured. The profile can then be used as part of an intelligent maintenance and diagnosis system or called condition-based maintenance to provide accurate and efficient task scheduling for cleaning and maintenance. Among other things, this may help to ensure that cleaning operations are performed when necessary and that the optimal capacity of a storage tank 102 can be attained in an automatic manner.

Although FIG. 1 illustrates an example automatic sediment or sludge detection, monitoring, and inspection system 100, various changes may be made to FIG. 1. For example, the system 100 could include any number of tanks 102, sensors 108, sensors 110, analyzing systems 112, or other components. Also, while often described as using infrared sensors, the system 100 could use any thermal sensor capable of capturing thermal images of one or more tanks 102.

Figure 2:
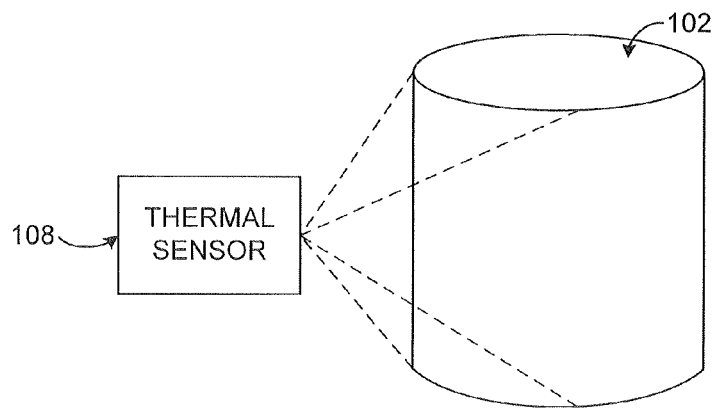
FIG. 2 illustrates an example capture of a thermal image of a storage tank according to this disclosure.

FIG. 2 illustrates an example capture of a thermal image of a storage tank 102 according to this disclosure. As shown in FIG. 2, the sensor 108 is aimed at one or more tanks 102 in order to capture thermal images of the tank(s) 102. Depending on the device specifications, the setup of the sensor 108 can be fairly flexible to carry out the measurements in the proximity of the tank 102. It may be noted that the sensor 108 can be synchronized with other sensors, such as level and temperature sensors, during the thermal measurements. Also, multiple sensors 108 can be deployed at different positions around a tank 102.

Figure 3A:
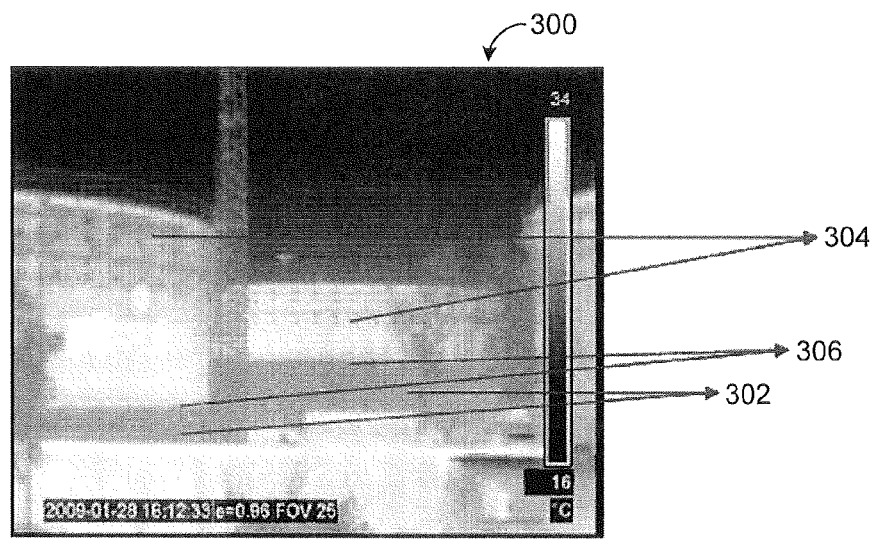
FIGS. 3A and 3B illustrate example captured thermal images of storage tanks according to this disclosure.
Figure 3B:
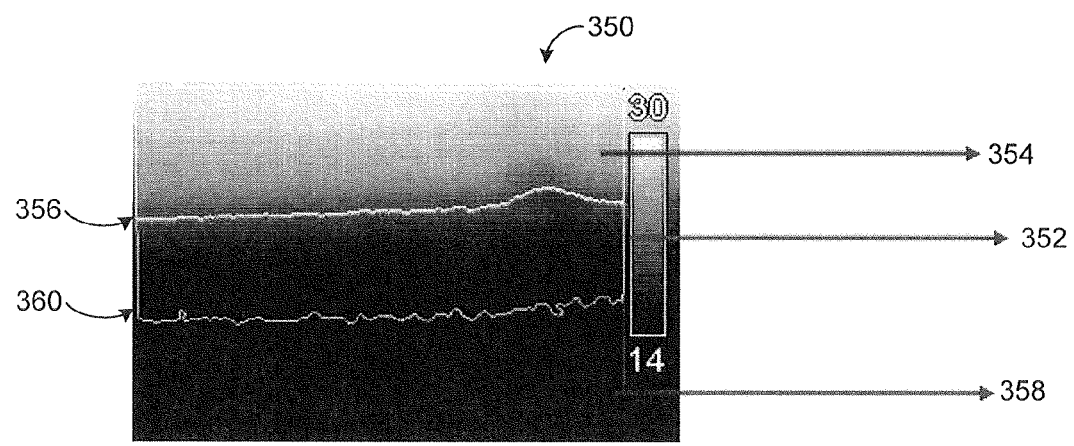

FIGS. 3A and 3B illustrate example captured thermal images 300 and 350 of storage tanks according to this disclosure. In particular, FIGS. 3A and 3B provide illustrative examples of how the profiling of sediment or sludge in storage tanks may appear. In FIG. 3A, a pseudo-color image 300 depicts the level of material 302 in two tanks, where no significant amount of sediment or sludge has built up in the tanks. Each tank contains an amount of the material 302, which meets empty space 304 in that tank at an air-material boundary 306. A legend at the side of the image 300 indicates the temperature difference between the material 302 and the empty space 304. Note that the empty space 304 need not simply represent air and could include, for example, vapor or other materials.

In FIG. 3B, a pseudo-color image 350 depicts the level of material 352 in a single tank, where the material 352 meets empty space 354 at an air-material boundary 356. The line representing the air-material boundary 356 varies somewhat here since the line is computed by the analyzing system 112. In this example, a significant amount of sediment or sludge 358 has built up in the tank and meets the material 352 at a sludge/sediment-material boundary 360. Again, the line representing the sludge/sediment-material boundary 360 varies somewhat since the line is computed by the analyzing system 112 and since the height of the sludge or sediment can vary across the tank.

The illustrations in FIGS. 3A and 3B show that the level of material and/or sediment/sludge can be correlated with various image profiles, and multi-sensor data can be used to discern the subtle difference in profiling. Also, a different sensing principle can be used to provide cross-reference on the same object like the material if the sediment/sludge formation process is not fast. The level, profile, or amount of the material and/or sediment/sludge can also be measured by normal level gauges and infrared sensors. The thermal-based inspection can also be used to provide additional information about the tank conditions, which can be helpful to the customers.

Although FIG. 2 illustrates an example capture of a thermal image of a storage tank 102, various changes may be made to FIG. 2. For example, the thermal sensor 108 could be placed in any suitable location to capture an image of part or all of the tank 102. Also, the sensor 108 could be used to capture images of one or multiple tanks 102. Although FIGS. 3A and 3B illustrate examples of captured thermal images of storage tanks, various changes could be made to FIGS. 3A and 3B. For instance, any thermal image of any number of tanks could be captured by a sensor 108. Also, the captured images could be grey-scale, pseudo-color, or other type of image.

Figure 4:
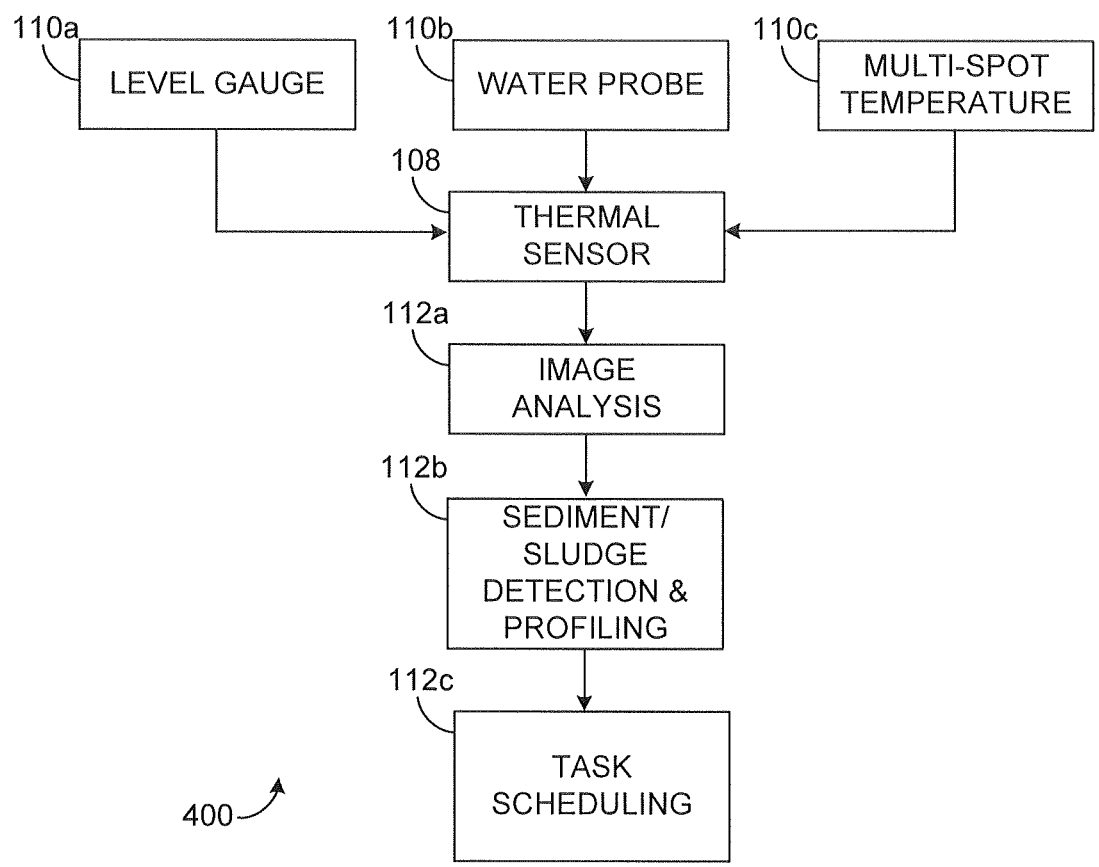
FIG. 4 illustrates an example information flow for automatic sediment or sludge detection, monitoring, and inspection according to this disclosure.

FIG. 4 illustrates an example information flow 400 for automatic sediment or sludge detection, monitoring, and inspection according to this disclosure. In particular, the information flow 400 illustrates the concept of multi-sensor data fusion for image classification and characterization. A thermal sensor 108 can use data from one or more level gauges 110a as a level indicator to measure the profile of the tank sediment/sludge 106 (such as when measurements of the sediment or sludge 106 are taken when the liquid level gets low). A water probe 110b and a multi-spot (vertical and horizontal) temperature sensor 110c can be used to help determine the separation of layered material and subtle temperature differences between them. In particular embodiments, the multi-spot temperature sensor 110c can provide a resolution of 0.1° C.

In this example, the thermal sensor 108 collects data from multiple sensors 110a-110c, although the thermal sensor 108 and the other sensors 110a-110c could provide data directly to the analyzing system 112 or other destination(s) for storage or use. Also, in this example, the analyzing system 112 could implement an image analysis function 112a, a sediment or sludge detection and profiling function 112b, and a task scheduling function 112c. The image analysis function 112a could include, for example, image pre-processing and image filtering. The detection and profiling function 112b could include, for example, identifying a level of sediment or sludge 106 in a tank 102. The task scheduling function 112c could include, for example, scheduling cleaning or other maintenance of the tank 102.

Although FIG. 4 illustrates an example information flow 400 for automatic sediment or sludge detection, monitoring, and inspection, various changes may be made to FIG. 4. For example, the thermal sensor 108 in some cases need not receive input from other sensors 110a-110c. Also, the analyzing system 112 could include any other suitable functionality and is not limited to just functions 112a-112c.

Figure 5:
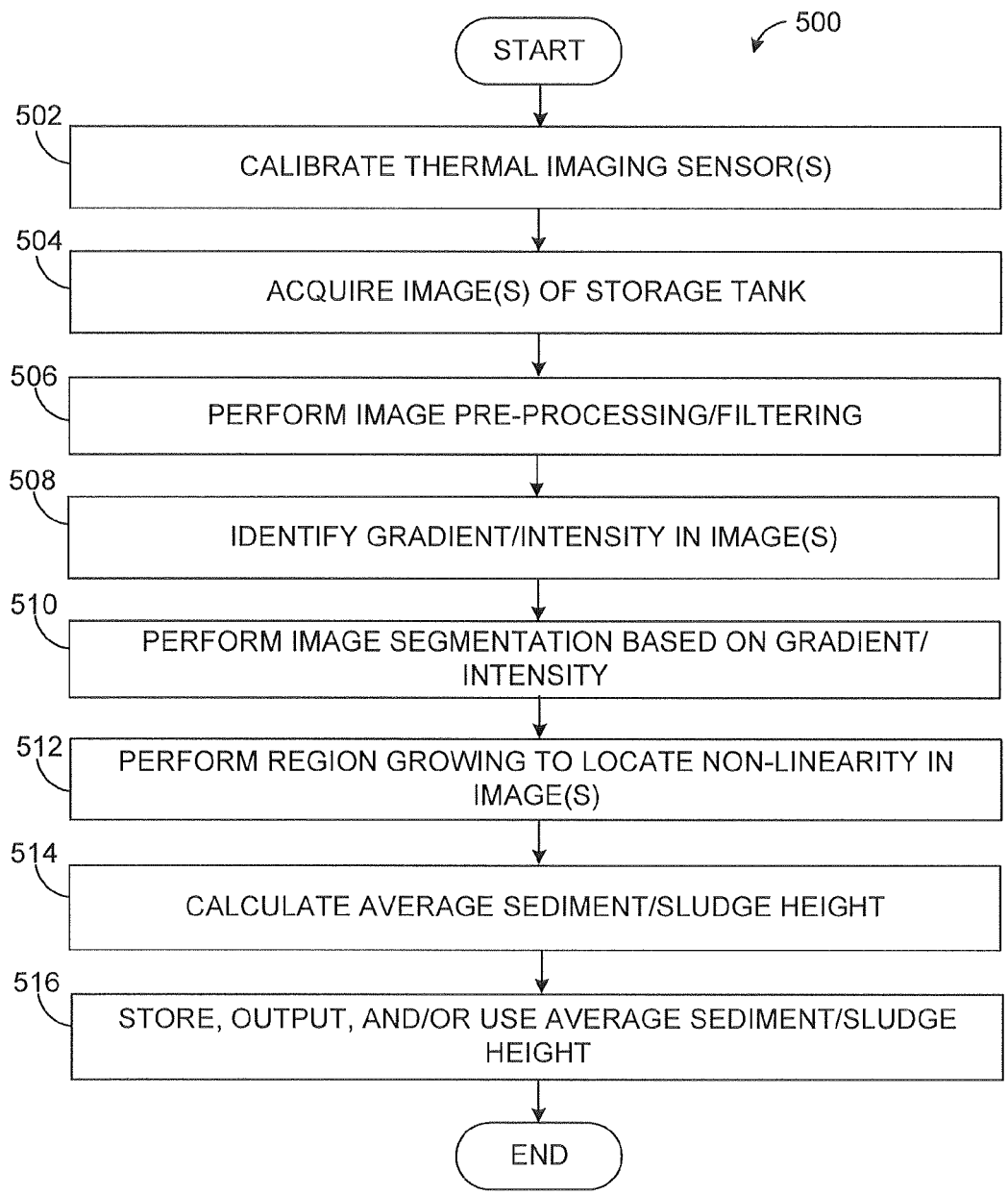
FIG. 5 illustrates an example method for automatic sediment or sludge detection, monitoring, and inspection according to this disclosure.

FIG. 5 illustrates an example method 500 for automatic sediment or sludge detection, monitoring, and inspection according to this disclosure. As shown in FIG. 5, one or more thermal imaging sensors are calibrated at step 502. The calibration can be performed in any suitable manner. For example, the calibration could be performed using a standard object placed next to a storage tank 102, with a sensor 108 positioned at different locations (horizontal as well as vertical distances) around the tank 102. Calibration can also be performed by using multiple sensors 108 at different locations with respect to the same object. The calibration can be done to obtain a conversion of relative coordinates of images to absolute coordinates.

One or more images of a storage tank are acquired at step 504. This could include, for example, the sensor 108 capturing one or more thermal images of the tank 102 and providing the images to the analyzing system 112. Image pre-processing and/or filtering is performed at step 506. This could include, for example, the analyzing system 112 pre-processing the image(s) to identify relevant portion(s) of the image(s) or filtering the image(s) to remove noise or other unnecessary data from the image(s).

Gradients or intensities in the image(s) are identified at step 508. This could include, for example, the analyzing system 112 identifying the intensities in different areas of the image(s). This could also include the analyzing system 112 identifying gradients in the image(s), where the gradients identify the directions of higher rates of increase in the intensity of the image(s).

Image segmentation occurs using the identified gradients or intensities at step 510. This could include, for example, the analyzing system 112 identifying portions of the image(s) likely to represent material 104 and sediment or sludge 106 in the tank 102. In some embodiments, this could be based on previously calibrated temperature/grey level values associated with previously-identified sediment or sludge.

Region growing is performed to locate one or more non-linearities in the segmented image(s) at step 512. This could include, for example, the analyzing system 112 expanding the different segmented regions (including the bottom region) to locate positions where the regions contact each other. Based on this, an average height of sediment or sludge in the tank is identified at step 514. This could include, for example, the analyzing system 112 calculating the average thickness of the sediment or sludge 106 across the diameter of the tank 102. This may be useful when the sediment or sludge height varies across the tank.

The average height of the sediment or sludge is stored, output, or otherwise used at step 516. This could include, for example, the analyzing system 112 outputting the identified sediment or sludge height to a maintenance system 120 or other system for scheduling cleaning or other maintenance. This could also include the analyzing system 112 displaying the identified sediment or sludge height or transmitting the identified sediment or sludge height to an operator device. The analyzing system 112 could take any other or additional action.

Although FIG. 5 illustrates an example method 500 for automatic sediment or sludge detection, monitoring, and inspection, various changes may be made to FIG. 5. For example, while shown as a series of steps, various steps in FIG. 5 could overlap, occur in parallel, or occur in a different order. Also, each of the steps shown in FIG. 5 could be implemented using any hardware, software, firmware, or combination thereof, such as by using one or more software algorithms. In addition, while shown as determining the average height of the sediment or sludge, the method 500 could include determining any level, profile, or amount of sediment or sludge in a tank 102.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "algorithm," "application," and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving an image of a storage tank at a processing system from a thermal sensor outside of the storage tank, the storage tank capable of storing one or more materials;
   receiving data from one or more other sensors at the processing system, the one or more other sensors comprising at least one sensor disposed within the storage tank; and
   processing the image and the data from the one or more other sensors to identify a profile of sludge or sediment present in the storage tank;
   wherein the profile identifies a plurality of heights of the sludge or sediment present in the storage tank horizontally across the storage tank, and wherein the heights of the sludge or sediment vary across the storage tank.

2. The method of claim 1, further comprising:
   automatically scheduling maintenance for the storage tank based on at least one of: the identified profile or a level or an amount of the sludge or sediment.

3. The method of claim 1, further comprising at least one of:
   displaying the identified profile of the sludge or sediment;
   transmitting the identified profile of the sludge or sediment to a user; and
   storing the identified profile of the sludge or sediment.

4. The method of claim 1, further comprising:
   capturing the image of the storage tank using an infrared camera.

5. The method of claim 1, wherein processing the image comprises:
   segmenting the image into multiple segments; and
   using the segments to identify a non-linearity in the image.

6. The method of claim 5, wherein the image is segmented into segments having different grey levels using grey level values associated with previously-identified sediment or sludge.

7. The method of claim 5, wherein the image is segmented into the segments using at least one of:
   one or more intensities of the image; and
   one or more gradients associated with the one or more intensities of the image.

8. The method of claim 1, wherein the one or more sensors comprise at least one of:
   a level sensor configured to measure an overall level of material in the storage tank;
   a water probe configured to detect water in the storage tank; and
   a multi-spot temperature sensor configured to measure temperatures at multiple locations within the storage tank.

9. An apparatus comprising:
   an interface configured to:
      receive an image of a storage tank from a thermal sensor outside of the storage tank, the storage tank capable of storing one or more materials; and
      receive data from one or more other sensors, the one or more other sensors comprising at least one sensor disposed within the storage tank; and
   a processing device configured to process the image and the data from the one or more other sensors and to identify a profile of sludge or sediment present in the storage tank;
   wherein the profile identifies a plurality of heights of the sludge or sediment present in the storage tank horizontally across the storage tank, and wherein the heights of the sludge or sediment vary across the storage tank.

10. The apparatus of claim 9, wherein the processing device is further configured to interact with a maintenance system to automatically schedule maintenance for the storage tank based on at least one of: the identified profile or a level or an amount of the sludge or sediment.

11. The apparatus of claim 9, wherein the processing device is further configured to at least one of:
    display the identified profile of the sludge or sediment;
    transmit the identified profile of the sludge or sediment to a user; and
    store the identified profile of the sludge or sediment.

12. The apparatus of claim 9, wherein the interface is configured to receive the image from an infrared camera.

13. The apparatus of claim 9, wherein the processing device is configured to process the image by:
    segmenting the image into multiple segments; and
    using the segments to identify a non-linearity in the image.

14. The apparatus of claim 13, wherein the processing device is configured to segment the image into segments having different grey levels using grey level values associated with previously-identified sediment or sludge.

15. The apparatus of claim 13, wherein the processing device is configured to segment the image into the segments using at least one of:
    one or more intensities of the image; and one or more gradients associated with the one or more intensities of the image.

16. The apparatus of claim 9, wherein, the one or more other sensors comprise at least one of:
- a level sensor configured to measure a level of material in the storage tank;
- a water probe configured to detect water in the storage tank; and
- a multi-spot temperature sensor configured to measure temperatures at multiple locations within the storage tank.

17. A non-transitory computer readable medium embodying a computer program, the computer program comprising: computer readable program code for:
- receiving an image of a storage tank from a thermal sensor outside of the storage tank, the storage tank capable of storing one or more materials;
- receiving data from one or more other sensors, the one or more other sensors comprising at least one sensor disposed within the storage tank; and
- processing the image and the data from the one or more other sensors to identify a profile of sludge or sediment present in the storage tank;
- wherein the profile identifies a plurality of heights of the sludge or sediment present in the storage tank horizontally across the storage tank, and wherein the heights of the sludge or sediment vary across the storage tank.

18. The computer readable medium of claim 17, further comprising:
- computer readable program code for automatically scheduling maintenance for the storage tank based on at least one of: the identified profile or a level or an amount of the sludge or sediment.

19. The computer readable medium of claim 17, wherein the computer readable program code for processing the image comprises:
- computer readable program code for segmenting the image into multiple segments having different grey levels using grey level values associated with previously-identified sediment or sludge; and
- computer readable program code for using the segments to identify a non-linearity in the image.

20. The computer readable medium of claim 19, wherein the computer readable program code for segmenting the image further comprises computer readable program code for segmenting the image into the segments using at least one of:
- one or more intensities of the image; and
- one or more gradients associated with the one or more intensities of the image.

\* \* \* \* \*